US008405646B2

(12) United States Patent
Lo et al.

(10) Patent No.: US 8,405,646 B2

(45) Date of Patent: Mar. 26, 2013

(54) DISPLAY PANEL AND ACTIVE DEVICE ARRAY SUBSTRATE THEREOF

(75) Inventors: Wan-Yu Lo, Taipei County (TW); Tsan-Chun Wang, Hsinchu (TW); Yu-Cheng Chen, Hsinchu (TW); Maw-Song Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 659 days.

(21) Appl. No.: 12/629,884

(22) Filed: Dec. 3, 2009

(65) Prior Publication Data

US 2011/0080388 A1 Apr. 7, 2011

(30) Foreign Application Priority Data

Oct. 5, 2009 (TW) .............................. 98133691 A

(51) Int. Cl.
*G06F 3/038* (2006.01)

(52) U.S. Cl. .......................... 345/205; 345/55; 345/206

(58) Field of Classification Search ........................ None
See application file for complete search history.

(56) References Cited

U.S. PATENT DOCUMENTS

2005/0248556 A1* 11/2005 Yoshinaga et al. ............ 345/204
2007/0182727 A1* 8/2007 Kobayashi et al. ........... 345/204

FOREIGN PATENT DOCUMENTS

CN 101216649 7/2008
CN 101487962 7/2009
JP 2001-174842 6/2001

OTHER PUBLICATIONS

"First Office Action of China Counterpart Application", issued on Aug. 27, 2010, p. 1-p. 8, in which the listed references were cited.

* cited by examiner

*Primary Examiner* — Adam R Giesy

(74) *Attorney, Agent, or Firm* — Jianq Chyun IP Office

(57) ABSTRACT

A display panel including an active device array substrate, an opposite substrate and a display medium is provided. The active device array substrate includes a substrate, scan lines, data lines, pixel units, and data signal transmission lines. The scan lines and data lines define a plurality of pixel regions on the substrate. Each pixel unit is disposed within one of the pixel regions respectively, and each pixel unit includes a plurality of sub-pixel units. The sub-pixel units within the same pixel unit are electrically connected with the same data line, and each sub-pixel unit within the same pixel unit is electrically connected with one of the scan lines respectively. Each data signal transmission line is electrically connected with one of the data lines, and an extending direction of the data signal transmission line is substantially parallel with an extending direction of the scan lines.

32 Claims, 9 Drawing Sheets

DISPLAY PANEL AND ACTIVE DEVICE ARRAY SUBSTRATE THEREOF

CROSS-REFERENCE TO RELATED APPLICATION

This application claims the priority benefit of Taiwan application serial no. 98133691, filed Oct.5, 2009. The entirety of the above-mentioned patent application is hereby incorporated by reference herein and made a part of specification.

BACKGROUND OF THE INVENTION

1. Field of the Invention

The present invention relates to a display panel and an active device array substrate thereof, and more particularly to a display panel and an active device array substrate having a slim border.

2. Description of Related Art

Generally, a display panel is composed of an active device array substrate, an opposite substrate and a display medium. The manufacture of the peripheral circuit on the non-display region (peripheral region) of the active device array, which can be integrated in the chip-on-glass process or the chip-on-thin-film process, and the manufacture of the active device array can be implemented at the same time.

FIG. 1 is a schematic top view of a conventional active device array substrate. FIG. 2 is a partially enlarged schematic diagram of the active device array substrate depicted in FIG. 1. As shown in FIG. 1 and FIG. 2, the active device array substrate 101 includes a substrate 110, a plurality of scan lines 122, a plurality of data lines 132, a plurality of pixel units 140 and a driving chip 150. The substrate 110 has a display region 112 and a non-display region 114, wherein the non-display region 114 surrounding the display region 112 with borders 114*a* and 114*b*. The scan lines 122 and the data lines 132 cross over each other so as to form several pixel units 140 within the display region 112. The driving chip 150 is located in the non-display region 114 of the substrate 110, and the scan lines 122 and the data lines 132 are electrically connected to the driving chip 150. Moreover, the data lines 132 are electrically connected to the driving chip 150 through the wire routing of the peripheral circuit at the upper and the lower sides of the border 114*b*.

For instance, in the display panel with the use of the trichromatic color (RGB) to adjust the level of the colorfulness and with a 640×480 video graphic array resolution, the amount of the scan lines 122 of the aforementioned active device array substrate 101 is 480 (G1, G2, G3 . . . G480) and the amount of the data lines 132 of the aforementioned active device array substrate 101 is 1920 (640×3=1920, S1, S2, S3 . . . S1920). Therefore, it is necessary for one of the borders at the upper and the lower sides of the display region 112 to have enough space for the wire routing of the peripheral circuit with 960 data lines (1920/2=960) therein. That is, the active device array substrate 101 should have enough border width W for the data lines 132 to be electrically connected to the driving chip 150. Herein, the border width W of the active device array substrate 101 is larger than 1.2 centimeter.

Due to high demand on smaller dimensions of the display panel applications such as portable phone and digital camera, how to decrease the border width W of the active device array substrate 101 in order to improve the portability of the electronic product becomes an important issue to be solved immediately.

SUMMARY OF THE INVENTION

The present invention provides an active device array substrate with a slim border capable of increasing the space utilization.

The present invention further provides a display panel comprising the aforementioned active device array substrate capable of reducing the production costs and increasing the product portability.

The present invention provides a display panel comprising an active device array substrate, an opposite substrate and a display medium. The active device array substrate includes a substrate, a plurality of scan lines, a plurality of data lines, a plurality of pixel units and a plurality of data signal transmission lines. The scan lines are disposed parallel to each other on the substrate. The data lines are disposed parallel to each other on the substrate, wherein the scan lines and the data lines cross over each other so as to define a plurality of pixel regions on the substrate. Each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively. The data signal transmission lines are disposed on the substrate, wherein each of the plurality of data signal transmission lines is electrically connected to one of the plurality of data lines respectively and the extending direction of the plurality of data signal transmission lines is substantially parallel to the extending direction of the plurality of scan lines. The opposite substrate is disposed above the active device array substrate. The display medium is disposed between the opposite substrate and the active device array substrate.

According to one embodiment of the present invention, the extending direction of the aforementioned plurality of scan lines is substantially perpendicular to the extending direction of the plurality of data lines.

According to one embodiment of the present invention, the number of the aforementioned plurality of data signal transmission lines is smaller than the number of the plurality of scan lines.

According to one embodiment of the present invention, each of the plurality of data signal transmission lines is disposed between two adjacent rows of the plurality of the pixel units.

According to one embodiment of the present invention, each of the plurality of data signal transmission lines is disposed between two adjacent rows of the plurality of the sub-pixel units.

According to one embodiment of the present invention, the aforementioned substrate has a display region and a non-display region contiguous to display region, and the plurality of pixel units are disposed within the display region, and the plurality of the scan lines, the plurality of the data lines and the plurality of the data signal transmission lines extend from the display region to the non-display region.

According to one embodiment of the present invention, the aforementioned active device array substrate further comprises a driving chip disposed on the non-display region, and the driving chip is electrically connected to the plurality of scan lines, the plurality of data lines and the plurality of data signal transmission lines.

According to one embodiment of the present invention, the aforementioned active device array substrate further comprises an integrated gate driver on array (GOA) disposed on the non-display region, and the integrated gate driver on array is electrically connected to the plurality of scan lines, the plurality of data lines and the plurality of data signal transmission lines.

According to one embodiment of the present invention, the driving chip and the integrated gate driver on array are disposed at the same side of the plurality of pixel units.

According to one embodiment of the present invention, the driving chip and the integrated gate driver on array are disposed at different sides of the plurality of pixel units.

The invention also provides an active device array substrate including a substrate, a plurality of scan lines, a plurality of data lines, a plurality of pixel units and a plurality of data signal transmission lines. The scan lines are disposed parallel to each other on the substrate. The data lines are disposed parallel to each other on the substrate, wherein the scan lines and the data lines cross over each other so as to define a plurality of pixel regions on the substrate. Each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively. The data signal transmission lines are disposed on the substrate, wherein each of the plurality of data signal transmission lines is electrically connected to one of the plurality of data lines respectively and the extending direction of the plurality of data signal transmission lines is substantially parallel to the extending direction of the plurality of scan lines.

According to the above description, since the active device array substrate of the present invention possesses a unique circuit design, the width of the border is decreased and the space utilization is increased. Moreover, the display panel of the present invention comprises the aforementioned active device array substrate so that the production cost is decreased and the product portability is increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
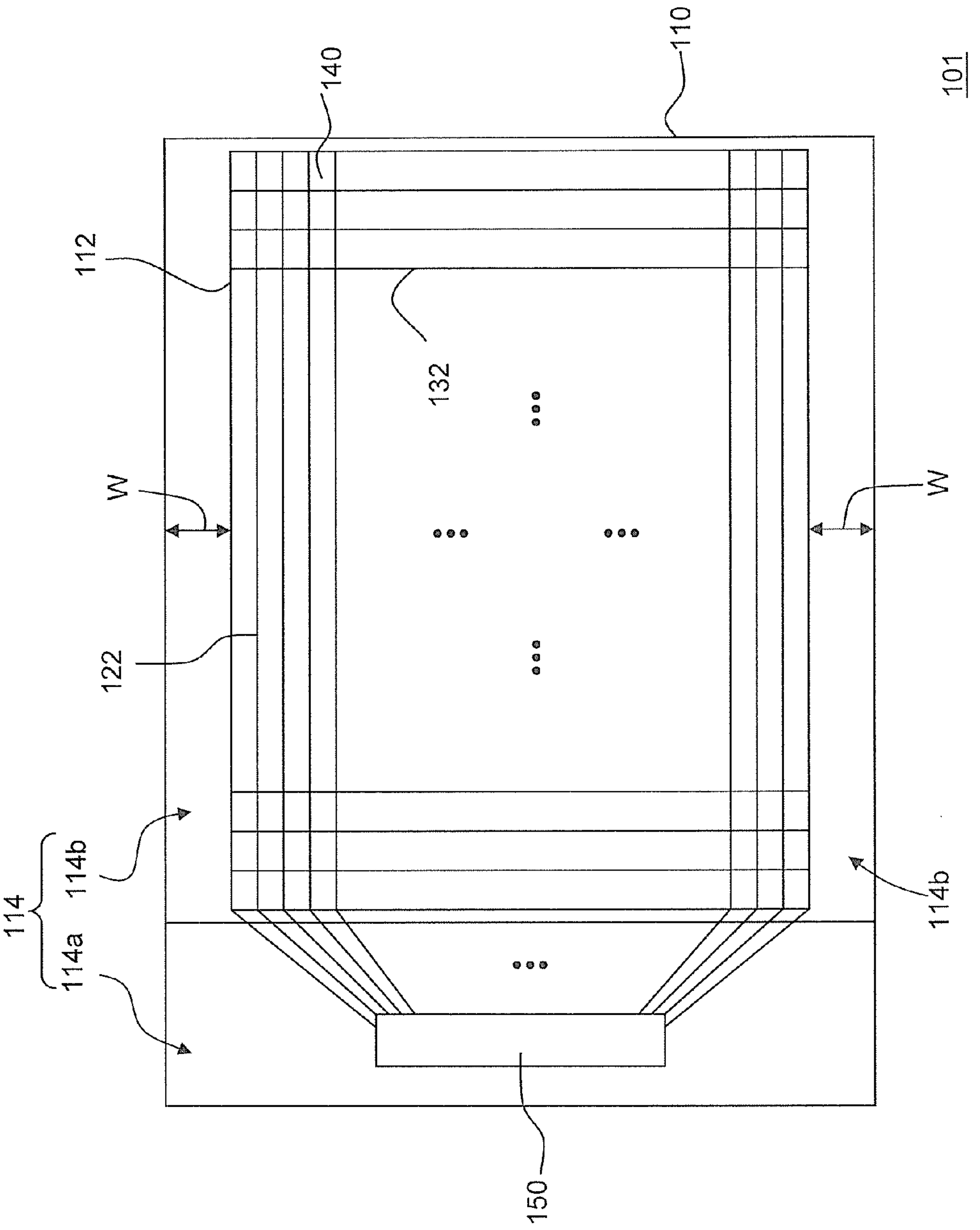
FIG. 1 (PRIOR ART)
FIG. 1 is a schematic top view of a conventional active device array substrate.
Figure 2:
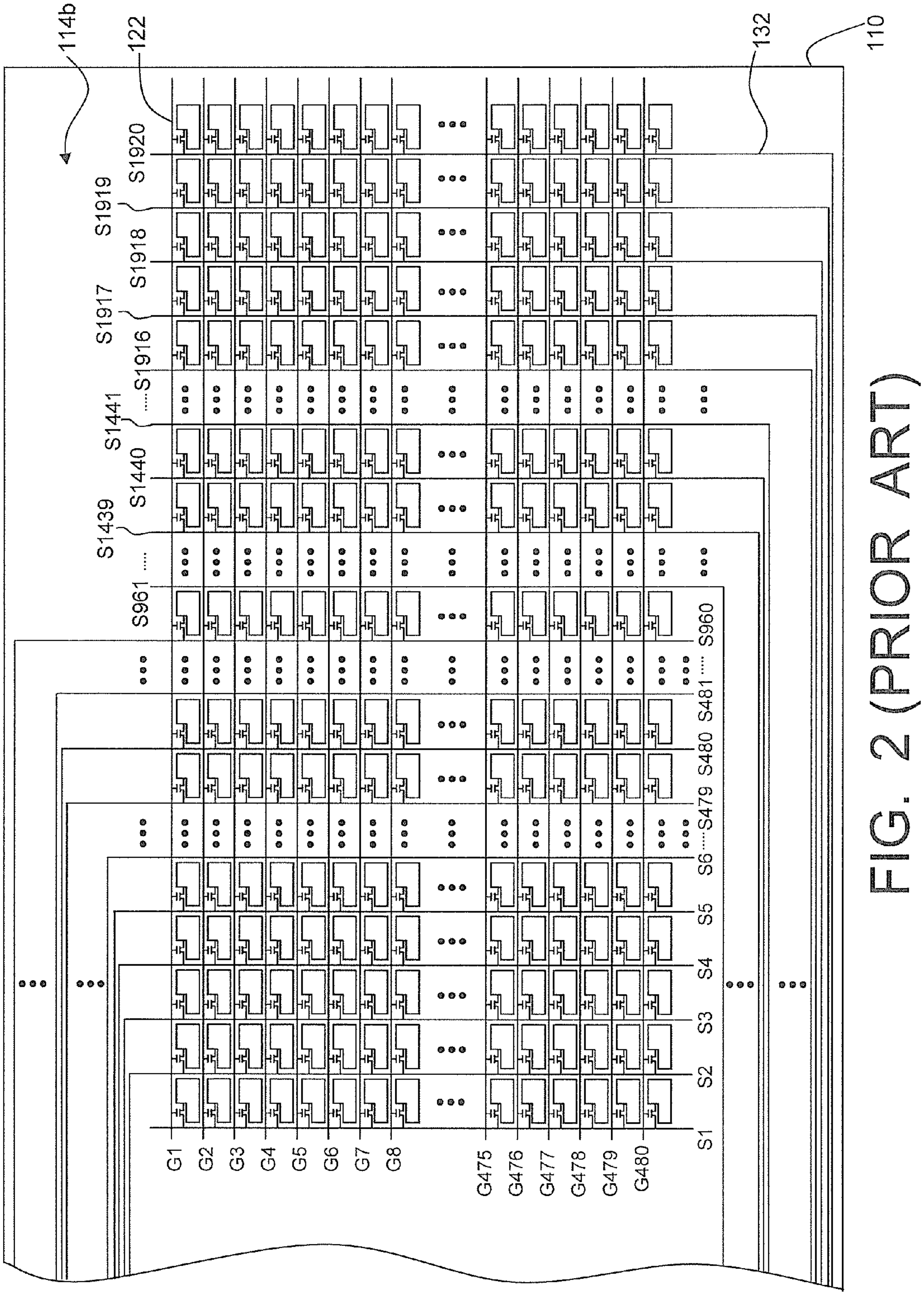
FIG. 2 (PRIOR ART)
FIG. 2 is a partially enlarged schematic diagram of the active device array substrate depicted in FIG. 1.
Figure 3:
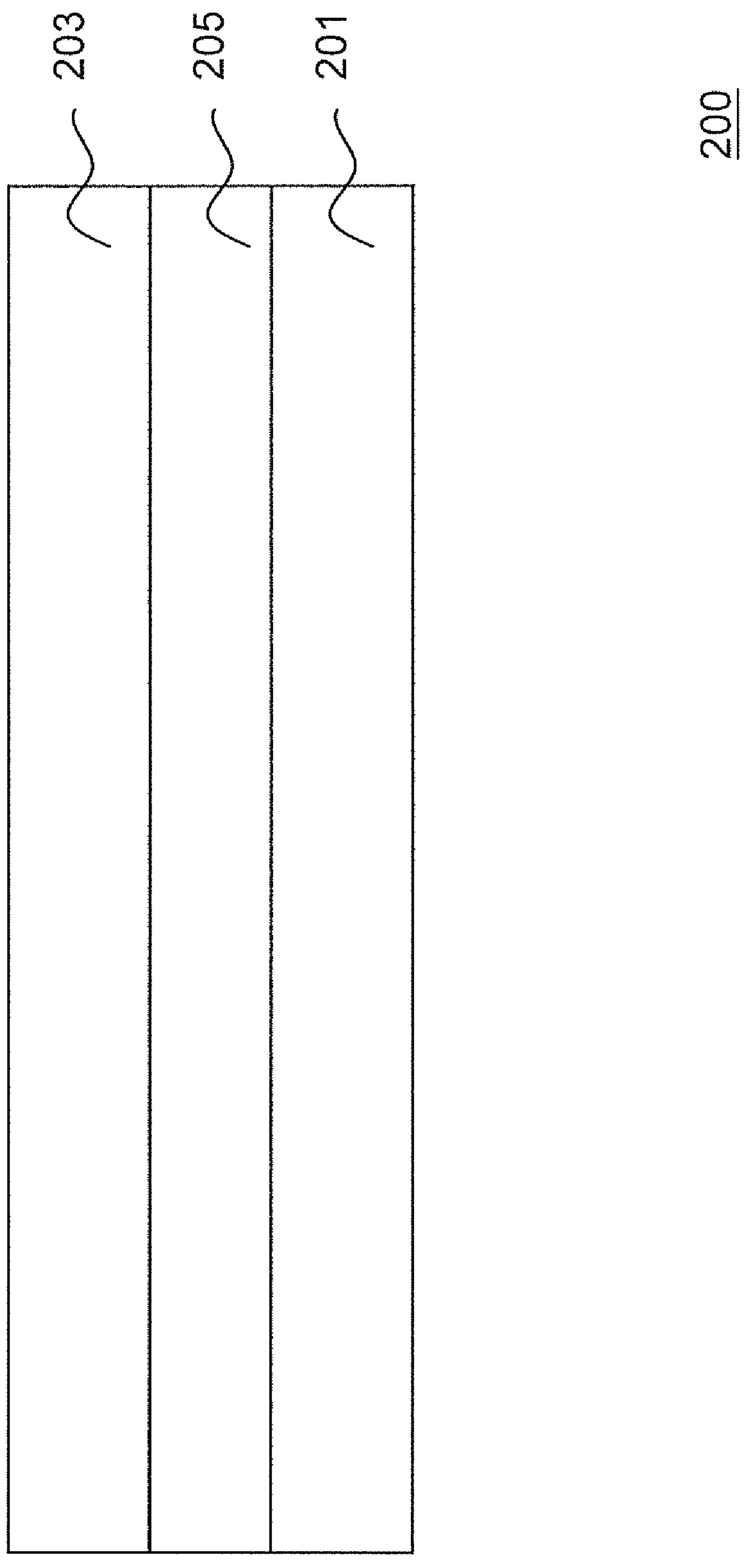
FIG. 3 is a schematic view of a display panel according to one embodiment of the present invention.

FIG. 3 is a schematic view of a display panel according to one embodiment of the present invention. As shown in FIG. 3, a display panel 200 includes an active device array substrate 201, an opposite substrate 203 and a display medium 205. The opposite substrate 203 is disposed above the active device array substrate 201. The display medium 205 is disposed between the opposite substrate 203 and the active device array substrate 201. The display panel 200 can be, for example, a liquid crystal display panel, an organic light emitting display panel, an electrophoretic display panel or other display panels. The opposite substrate 203 can be, for example, a color filter substrate, and the display medium 205 can be, for example, a liquid crystal layer or other materials. In the present embodiment, the display panel 200 can be, for example, a landscape viewing display panel.

Figure 4:
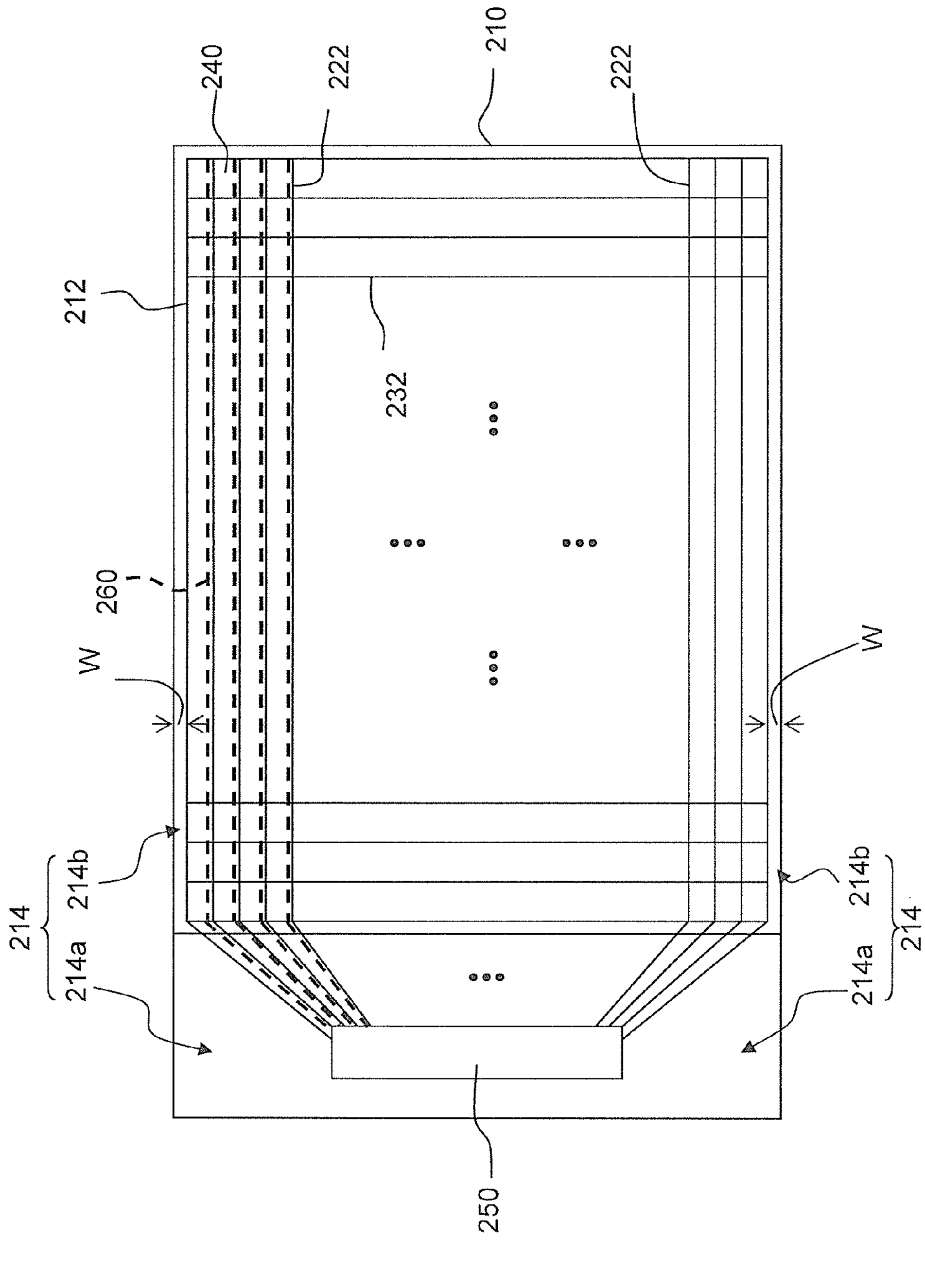
FIG. 4 is a schematic top view illustrating an active device array substrate of the display panel in FIG. 3.
Figure 5:
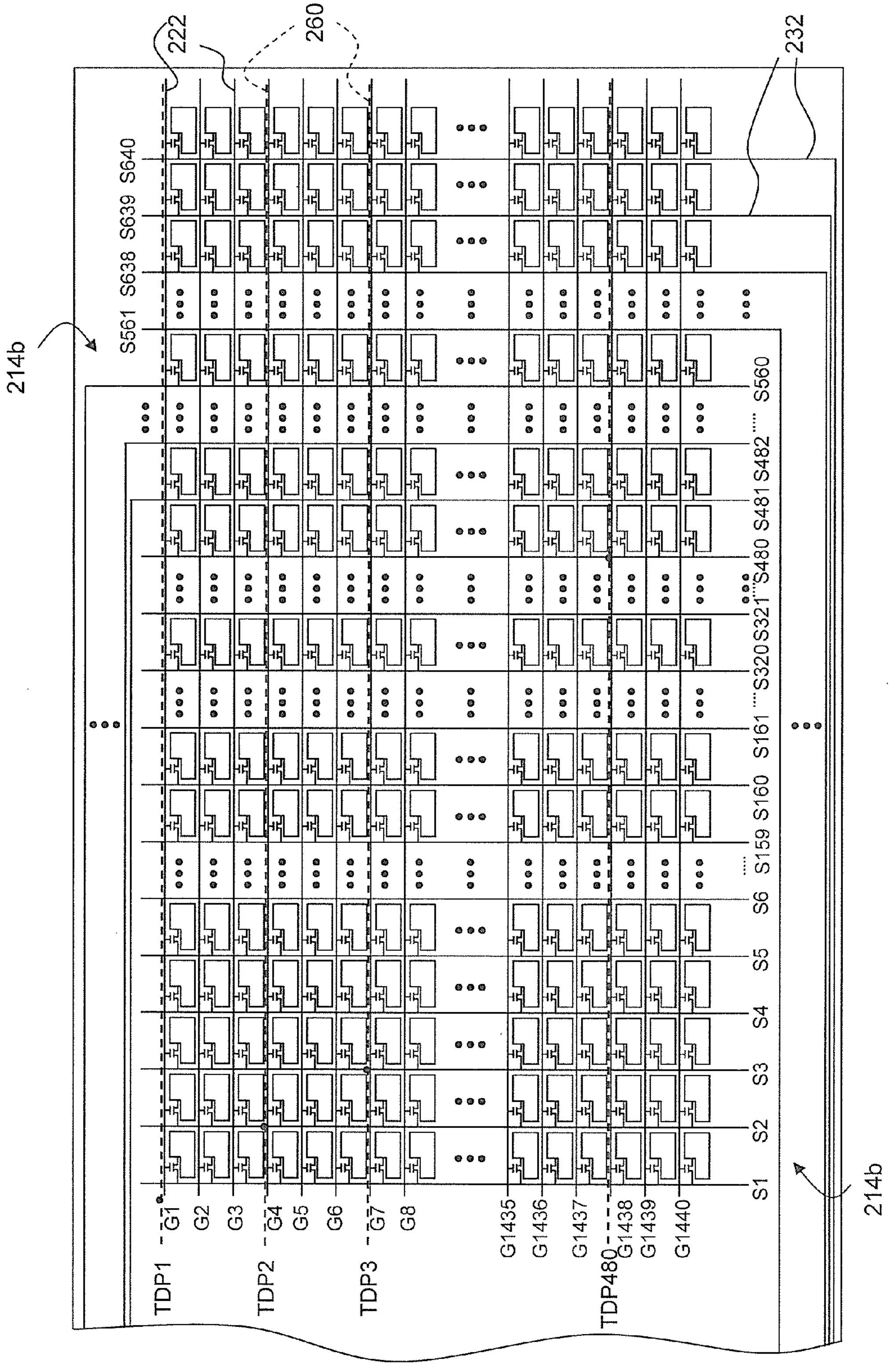
FIG. 5 is a partial schematic view of FIG. 4.
Figure 6:
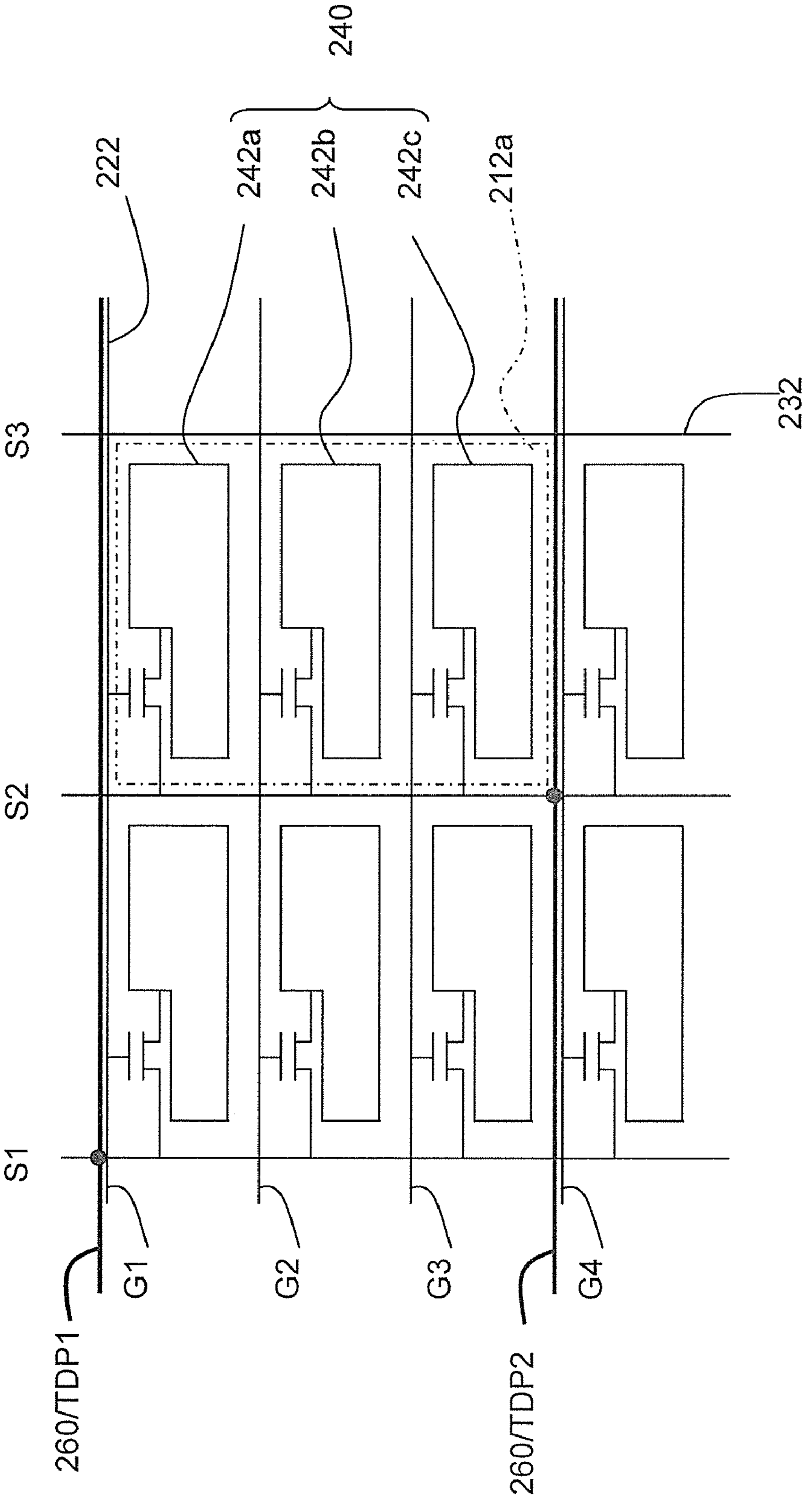
FIG. 6 is a partially enlarged schematic diagram of FIG. 5.

FIG. 4 is a schematic top view illustrating an active device array substrate of the display panel in FIG. 3. FIG. 5 is a partial schematic view of FIG. 4. FIG. 6 is a partially enlarged schematic diagram of FIG. 5. As shown in FIG. 4, FIG. 5 and FIG. 6, furthermore, the active device array substrate 201 including a substrate 210, a plurality of scan lines 222, a plurality of data lines 232, a plurality of pixel units 240 and a plurality of data signal transmission lines 260.

In the present embodiment, the substrate 210 has a display region 212 and a non-display region 214 contiguous to the display region 212. As for the active device array substrate 201 shown in FIG. 4, the non-display region 214 includes a border 214*a* at the left-hand side of the display region 212 and a border 214*b* at the upper and lower sides of the display region 212. The pixel units 240 are disposed within the display region 212, and the scan lines 222, the data lines 232 and the data signal transmission lines 260 extend from the display region 212 to the non-display region 214.

The scan lines 222 are disposed parallel to each other on the substrate 210. The data lines 232 are disposed parallel to each other on the substrate 210, wherein the scan lines 222 and the data lines 232 cross over each other so as to define a plurality of pixel regions 212*a* on the substrate 210, as shown in FIG. 6. In the present embodiment, the extending direction of scan lines 222 is substantially perpendicular to the extending direction of the data lines 232.

Moreover, each of the pixel units 240 is disposed within one of the pixel regions 212*a* respectively, and each of the pixel units 240 comprises three sub-pixel units 242*a*, 242*b* and 242*c*, and the sub-pixel units 242*a*, 242*b* and 242*c* within the same pixel unit 240 are electrically connected to the same data line 232, and each of the sub-pixel units 242*a*, 242*b* and 242*c* within the same pixel unit is electrically connected to one of the scan lines 222 respectively. The sub-pixel units 242*a*, 242*b* and 242*c* can be, for example, respectively correspond to a red filter layer, a green filter layer and a blue filter layer (not shown) to display various levels of colorfulness. In summary, the active device array substrate 201 is an active device array substrate with tri-gate driving structure.

Since three sub-pixel units 242*a*, 242*b* and 242*c* within the same pixel unit 240 share the same data line 232 to transmit the corresponding data signal, under this structure design, the number of the scan lines 222 is increased and the number of the data lines is decreased. In other words, the number of the source driving chips (not shown) which are bonded to the active device array substrate 201 can be effectively decreased.

Since production cost of the source driving chips is high, the decrease in the number of the source driving chips in use can effectively decrease the manufacturing cost. Furthermore, because the signals processed by the source driving chip are relatively complicated and power-consuming, the less the number of the source driving chips is and the more the power consumed by the active device array substrate 201 can be saved.

As shown in FIG. 3, FIG. 4 and FIG. 5, the data signal transmission lines 260 are disposed on the substrate 210, wherein each of the data signal transmission lines 260 is electrically connected to one of the data lines 232 respectively through the corresponding nodes or contact plugs and the extending direction of the data signal transmission lines 260 is substantially parallel to the extending direction of the scan lines 222. Herein, the data signal transmission lines 260 can be, for example, a circuit layout using the multi-layered metal layer and disposed over the scan lines 222 so that the opening ratio of the display panel 200 can be prevented from being affected. Further, the active device array substrate 201 further comprises a driving chip 250 disposed on the non-display region 214, wherein the driving chip 250 is electrically connected to the scan lines 222, the data lines 232 and the data signal transmission lines 260.

In the present embodiment, the number of the data signal transmission lines 260 is smaller than the number of the scan lines 222. That is, only portions of the data lines 232 are connected to the data signal transmission lines 260. In the present embodiment, the number of the data signal transmission lines 260 is one third or two thirds of the number of the data lines 232.

For instance, the resolution of the display panel 200 is a 640×480 video graphic array resolution, and the active device array substrate 201 is driven by the aforementioned tri-gate driving structure. Thus, the amount of the data lines 232 of the active device array substrate 201 is 640 (S1, S2, S3 . . . S640), and the amount of the scan lines 222 is 1440 (480×3=1440, G1, G2, G3 . . . G1440). In the present embodiment, each of the data signal transmission lines 260 can be, for example, disposed between the two adjacent rows of the pixel units 240, and the amount of the data signal transmission lines 260 is 480 (TGP1, TGP2 . . . TGP480). Since the data lines 232 can be electrically connected to the driving chip 250 through the data signal transmission lines 260, only 160 data lines 232 (640−480=160) in the non-display region 214 of the active device array substrate 201 are needed in the wire routing of the peripheral circuit. In other words, the wire routing at the border 214*b* at one of the upper and the lower sides of the active device array substrate 201 only has 80 data lines 232 (160/2=80).

According to the aforementioned circuit design, the active device array substrate 201 of the present invention has a border with a width W smaller than 1 millimeter. That is, comparing to the conventional active device array substrate 101, the active device array device 201 possesses a relatively slim border 214*b* so as to improve the space utilization. Hence, the product applied with the active device array substrate 201 possesses a relatively better portability.

Figure 7:
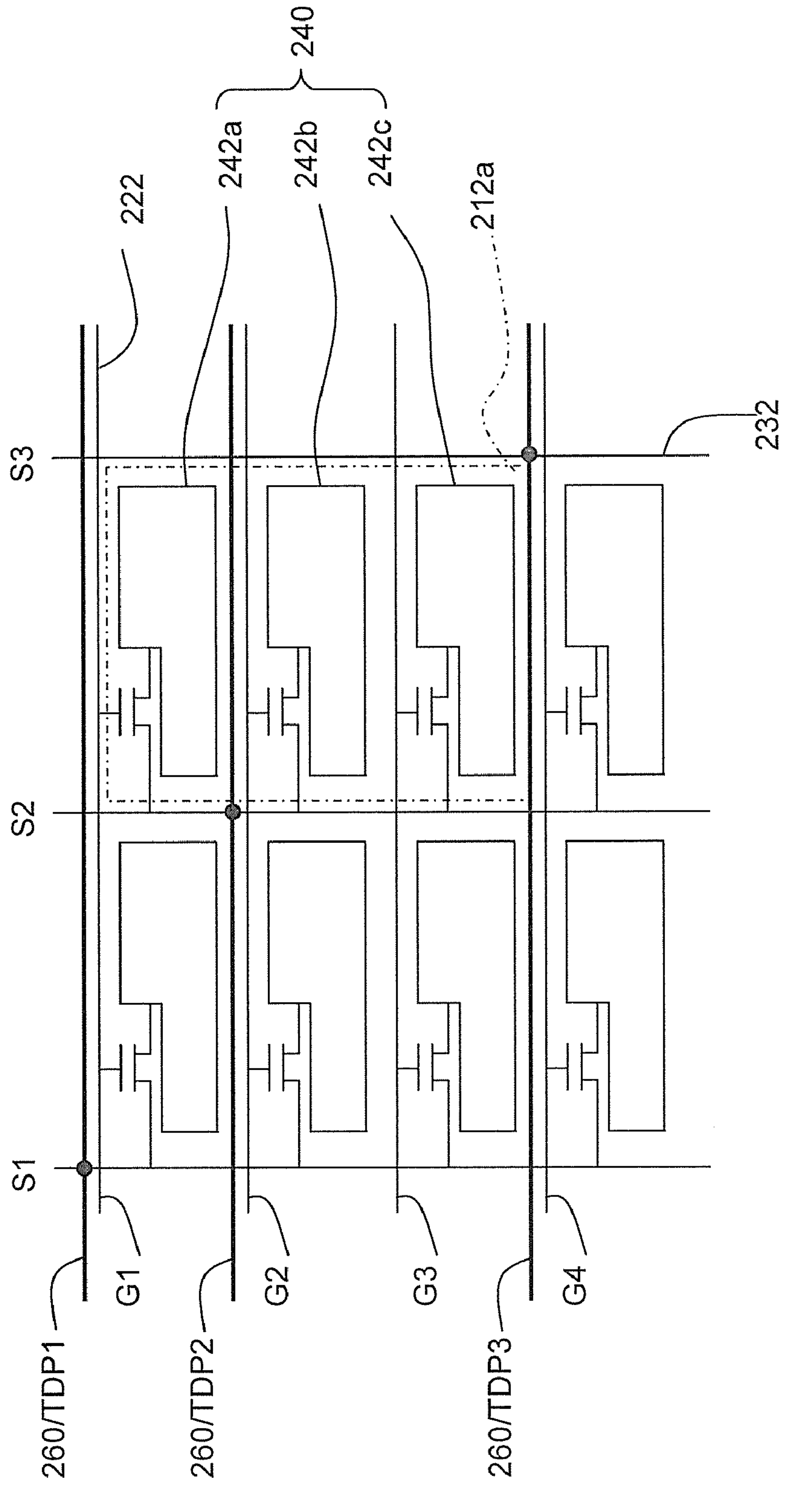
FIG. 7 is a partially enlarged schematic diagram illustrating an active device array substrate according to another embodiment of the present invention.

FIG. 7 is a partially enlarged schematic diagram illustrating an active device array substrate according to another embodiment of the present invention. As shown in FIG. 7, in another embodiment, each of the data signal transmission lines 260 of the active device array substrate 201 can be disposed between the two adjacent rows of the sub-pixel units 242. That is, the number of the data signal transmission lines 260 can be further increased to reduce the width W of the border for the wire routing of the data lines 232. Further, all of the data lines 232 can be even connected to the data signal transmission lines 260 to achieve the frameless effect.

In some embodiments, the number of the data signal transmission lines 260 can be equal to the number of the data lines 232. That is, the data lines 232 can be electrically connected to the driving chip 250 completely through the data signal transmission lines 260. In other words, the width W of the border of the active device array substrate 201 can be further decreased to obtain a better space utilization. The above description is only an exemplar and the present invention is not limited to the number and the location of the data signal transmission lines 260. People skilled in the art can adjust the number and the location of the data signal transmission lines 260 according to the practical application.

Figure 8:
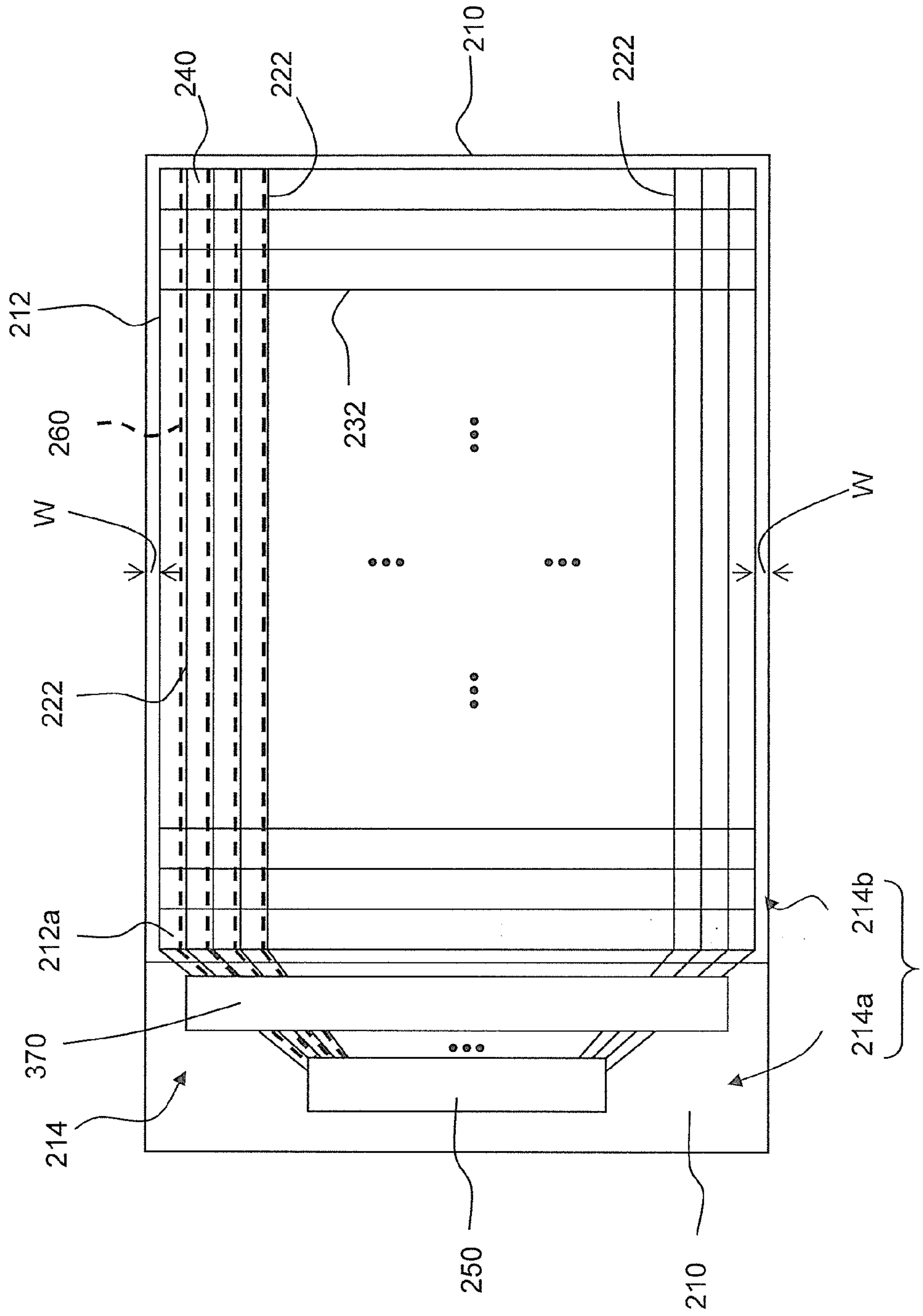
FIG. 8 is a schematic top view illustrating an active device array substrate according to one embodiment of the present invention.

FIG. 8 is a schematic top view illustrating an active device array substrate according to one embodiment of the present invention. As shown in FIG. 8, the active device array substrate 301 possesses all components shown in the active device array substrate 201, wherein identical elements are referred to by the same reference numbers, and detailed descriptions thereof are omitted hereinafter.

Further, the active device array substrate 301 further comprises an integrated gate driver on array (GOA) 370 disposed on the non-display region 214, wherein the integrated gate driver on array 370 is electrically connected to the scan lines 222, the data lines 232 and the data signal transmission lines 260. It should be noticed that, in the aforementioned active device array substrate 201, because the number of the data lines 232 is decreased and the number of the scan lines 222 is increased, the demands on the gate driving chip (not shown) are increased. Therefore, in the active device array substrate 301, the configuration of the integrated gate driver on array 370 can help to decrease the number of the gate driving chips used by the scan lines 222 and further to decrease the manufacturing cost.

Figure 9:
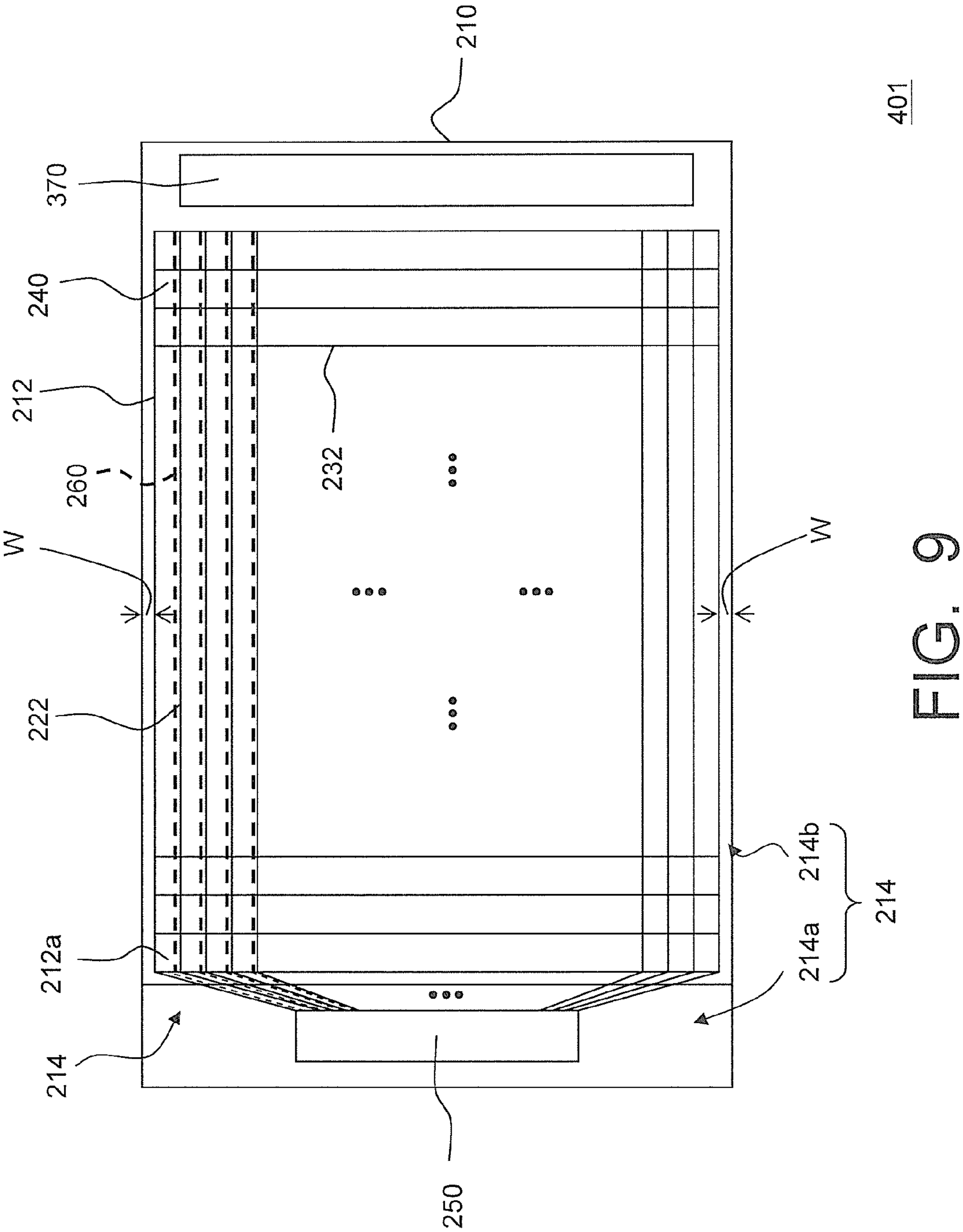
FIG. 9 is a schematic top view illustrating an active device array substrate according to one embodiment of the present invention.

Herein, the driving chip 250 and the integrated gate driver on array 370 are located at the same side of the pixel units 240. However, the present invention is not limited by the aforementioned configuration. In other embodiments, as shown in FIG. 9, the driving chip 250 and the integrated gate driver on array 370 of the active device array substrate 401 can be located at different sides of the pixel units 240. Therefore, the configurations of the driving chip and the integrated gate driver on array can be further adjusted according to the actual application.

According to the above description, the active device array substrate of the present invention possesses a unique circuit design which can decrease the number of the data lines and the number of the source driving chips. Therefore, the active device array substrate possesses the advantages including slim border, better space utilization and lower power consumption. Moreover, the display panel of the present invention comprises the aforementioned active device array substrate so that the production cost is decreased and the product portability is increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display panel, comprising:

an active device array substrate, wherein the active device array substrate comprises:

a substrate;

a plurality of scan lines disposed parallel to each other on the substrate;

a plurality of data lines disposed parallel to each other on the substrate, wherein the scan lines and the data lines cross over each other and define a plurality of pixel regions on the substrate;

a plurality of pixel units, wherein each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively;

a plurality of data signal transmission lines disposed on the substrate, wherein each of the plurality of data signal transmission lines is electrically connected to one of the plurality of data lines respectively and an extending direction of the plurality of data signal transmission lines is substantially parallel to an extending direction of the plurality of scan lines, and wherein the number of the plurality of data signal transmission lines is smaller than the number of the plurality of scan lines, and each of the plurality of data signal transmission lines is disposed between two adjacent rows of the plurality of the sub-pixel units;

an opposite substrate disposed above the active device array substrate; and a display medium disposed between the opposite substrate and the active device array substrate.

2. The display panel of claim 1, wherein the extending direction of the plurality of scan lines is substantially perpendicular to the extending direction of the plurality of data lines.

3. The display panel of claim 1, wherein each of the plurality of data signal transmission lines is disposed between two adjacent rows of the plurality of the pixel units.

4. The display panel of claim 1, wherein the substrate comprises a display region and a non-display region contiguous to the display region, and the plurality of pixel units are disposed within the display region, and the plurality of the scan lines, the plurality of the data lines and the plurality of the data signal transmission lines extend from the display region to the non-display region.

5. The display panel of claim 4, wherein the active device array substrate further comprises a driving chip disposed on the non-display region, and the driving chip is electrically connected to the plurality of scan lines, the plurality of data lines and the plurality of data signal transmission lines.

6. The display panel of claim 4, wherein the active device array substrate further comprises an integrated gate driver on array (GOA) disposed on the non-display region, and the integrated gate driver on array is electrically connected to the plurality of scan lines, the plurality of data lines and the plurality of data signal transmission lines.

7. The display panel of claim 6, wherein the driving chip and the integrated gate driver on array are disposed at the same side of the plurality of pixel units.

8. The display panel of claim 6, wherein the driving chip and the integrated gate driver on array are disposed at different sides of the plurality of pixel units.

9. An active device array substrate, comprising:

a substrate;

a plurality of scan lines disposed parallel to each other on the substrate;

a plurality of data lines disposed parallel to each other on the substrate, wherein the scan lines and the data lines cross over each other and define a plurality of pixel regions on the substrate;

a plurality of pixel units, wherein each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively; and a plurality of data signal transmission lines disposed on the substrate, wherein each of the plurality of data signal transmission lines is electrically connected to one of the plurality of data lines respectively and an extending direction of the plurality of data signal transmission lines is substantially parallel to an extending direction of the plurality of scan lines, and wherein the number of the plurality of data signal transmission lines is smaller than the number of the plurality of scan lines, and each of the plurality of data signal transmission lines is disposed between two adjacent rows of the plurality of the sub-pixel units.

10. The active device array substrate of claim 9, wherein the extending direction of the plurality of scan lines is substantially perpendicular to the extending direction of the plurality of data lines.

11. The active device array substrate of claim 9, wherein each of the plurality of data signal transmission lines is disposed between two adjacent rows of the plurality of the pixel units.

12. The active device array substrate of claim 9, wherein the substrate comprises a display region and a non-display region contiguous to the display region, and the plurality of pixel units are disposed within the display region, and the plurality of the scan lines, the plurality of the data lines and the plurality of the data signal transmission lines extend from the display region to the non-display region.

13. The active device array substrate of claim 12 further comprising a driving chip disposed on the non-display region, wherein the driving chip is electrically connected to the plurality of scan lines, the plurality of data lines and the plurality of data signal transmission lines.

14. The active device array substrate of claim 12 further comprising an integrated gate driver on array (GOA) disposed on the non-display region, wherein the integrated gate driver on array is electrically connected to the plurality of scan lines, the plurality of data lines and the plurality of data signal transmission lines.

15. The active device array substrate of claim 14, wherein the driving chip and the integrated gate driver on array are disposed at the same side of the plurality of pixel units.

16. The active device array substrate of claim 14, wherein the driving chip and the integrated gate driver on array are disposed at different sides of the plurality of pixel units.

17. A display panel, comprising:

an active device array substrate, wherein the active device array substrate comprises:

a substrate;

a plurality of scan lines disposed parallel to each other on the substrate;

a plurality of data lines disposed parallel to each other on the substrate, wherein the scan lines and the data lines cross over each other and define a plurality of pixel regions on the substrate;

a plurality of pixel units, wherein each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively;

a plurality of data signal transmission lines disposed on the substrate, wherein each of the plurality of data signal transmission lines is electrically connected to one of the plurality of data lines respectively and an extending direction of the plurality of data signal transmission lines is substantially parallel to an extending direction of the plurality of scan lines, and wherein the number of the plurality of data signal transmission lines is smaller than the number of the plurality of scan lines, and each of the plurality of data signal transmission lines is disposed between two adjacent rows of the plurality of the pixel units;

an opposite substrate disposed above the active device array substrate; and a display medium disposed between the opposite substrate and the active device array substrate.

18. The display panel of claim 17, wherein the extending direction of the plurality of scan lines is substantially perpendicular to the extending direction of the plurality of data lines.

19. The display panel of claim 17, wherein each of the plurality of data signal transmission lines is disposed between two adjacent rows of the plurality of the sub-pixel units.

20. The display panel of claim 17, wherein the substrate comprises a display region and a non-display region contiguous to the display region, and the plurality of pixel units are disposed within the display region, and the plurality of the scan lines, the plurality of the data lines and the plurality of the data signal transmission lines extend from the display region to the non-display region.

21. The display panel of claim 20, wherein the active device array substrate further comprises a driving chip disposed on the non-display region, and the driving chip is electrically connected to the plurality of scan lines, the plurality of data lines and the plurality of data signal transmission lines.

22. The display panel of claim 20, wherein the active device array substrate further comprises an integrated gate driver on array (GOA) disposed on the non-display region, and the integrated gate driver on array is electrically connected to the plurality of scan lines, the plurality of data lines and the plurality of data signal transmission lines.

23. The display panel of claim 22, wherein the driving chip and the integrated gate driver on array are disposed at the same side of the plurality of pixel units.

24. The display panel of claim 22, wherein the driving chip and the integrated gate driver on array are disposed at different sides of the plurality of pixel units.

25. An active device array substrate, comprising:

a substrate;

a plurality of scan lines disposed parallel to each other on the substrate;

a plurality of data lines disposed parallel to each other on the substrate, wherein the scan lines and the data lines cross over each other and define a plurality of pixel regions on the substrate;

a plurality of pixel units, wherein each of the plurality of pixel units is disposed within one of the plurality of pixel regions respectively, and each of the plurality of pixel units comprises a plurality of sub-pixel units, and the sub-pixel units within the same pixel unit are electrically connected to the same data line, and each of the plurality of sub-pixel units within the same pixel unit is electrically connected to one of the plurality of the scan lines respectively; and a plurality of data signal transmission lines disposed on the substrate, wherein each of the plurality of data signal transmission lines is electrically connected to one of the plurality of data lines respectively and an extending direction of the plurality of data signal transmission lines is substantially parallel to an extending direction of the plurality of scan lines, and wherein the number of the plurality of data signal transmission lines is smaller than the number of the plurality of scan lines, and each of the plurality of data signal transmission lines is disposed between two adjacent rows of the plurality of the pixel units.

26. The active device array substrate of claim 25, wherein the extending direction of the plurality of scan lines is substantially perpendicular to the extending direction of the plurality of data lines.

27. The active device array substrate of claim 25, wherein each of the plurality of data signal transmission lines is disposed between two adjacent rows of the plurality of the sub-pixel units.

28. The active device array substrate of claim 25, wherein the substrate comprises a display region and a non-display region contiguous to the display region, and the plurality of pixel units are disposed within the display region, and the plurality of the scan lines, the plurality of the data lines and the plurality of the data signal transmission lines extend from the display region to the non-display region.

29. The active device array substrate of claim 28 further comprising a driving chip disposed on the non-display region, wherein the driving chip is electrically connected to the plurality of scan lines, the plurality of data lines and the plurality of data signal transmission lines.

30. The active device array substrate of claim 28 further comprising an integrated gate driver on array (GOA) disposed on the non-display region, wherein the integrated gate driver on array is electrically connected to the plurality of scan lines, the plurality of data lines and the plurality of data signal transmission lines.

31. The active device array substrate of claim 30, wherein the driving chip and the integrated gate driver on array are disposed at the same side of the plurality of pixel units.

32. The active device array substrate of claim 30, wherein the driving chip and the integrated gate driver on array are disposed at different sides of the plurality of pixel units.

* * * * *